United States Patent
Marinelli

(10) Patent No.: US 9,435,550 B1
(45) Date of Patent: Sep. 6, 2016

(54) CENTRAL AIR CONDITIONING SCENT INJECTOR

(76) Inventor: Vittorio Marinelli, Deerfield Beach, FL (US)

( * ) Notice: Subject to any disclaimer, the term of this patent is extended or adjusted under 35 U.S.C. 154(b) by 1244 days.

(21) Appl. No.: 13/329,189

(22) Filed: Dec. 16, 2011

Related U.S. Application Data

(60) Provisional application No. 61/424,614, filed on Dec. 17, 2010.

(51) Int. Cl.
F24F 6/00 (2006.01)
F24F 3/16 (2006.01)
F24F 3/12 (2006.01)
F24F 11/00 (2006.01)

(52) U.S. Cl.
CPC ............... F24F 3/12 (2013.01); F24F 11/001 (2013.01); *F24F 2003/1689* (2013.01)

(58) Field of Classification Search
CPC .. F24F 2003/1689; F24F 3/12; F24F 11/001; A61L 9/14; A61L 9/02; A61L 9/12; A61L 2/20; B60H 3/0035; B60H 3/0007; B60H 3/0021; B60H 3/035
USPC ...................................... 62/78; 454/110, 337
See application file for complete search history.

(56) References Cited

U.S. PATENT DOCUMENTS

| | | |
|---|---|---|
| 2,523,373 A | 9/1950 | Jennings et al. |
| 4,303,617 A | 12/1981 | Bryson |
| 4,601,886 A | 7/1986 | Hudgins |
| 4,617,157 A | 10/1986 | Stein et al. |
| 4,780,253 A | 10/1988 | Fukuhara et al. |
| 4,913,034 A | 4/1990 | Ripple et al. |
| 5,011,632 A | 4/1991 | Yano et al. |
| 5,015,442 A | 5/1991 | Hirai |
| 5,023,020 A | 6/1991 | Machida et al. |
| 5,030,253 A | 7/1991 | Tokuhiro et al. |
| 5,174,967 A | 12/1992 | Fukuhara |
| 5,186,869 A | 2/1993 | Stumpf et al. |
| 5,302,359 A | 4/1994 | Nowatzki |
| 5,466,399 A | 11/1995 | Von Kempski et al. |
| 5,704,832 A | 1/1998 | Borrell |
| 5,756,047 A | 5/1998 | West et al. |
| 5,911,742 A | 6/1999 | Akazawa |
| 5,924,597 A | 7/1999 | Lynn |
| 5,957,771 A * | 9/1999 | Baek ............................. 454/233 |
| 5,958,346 A * | 9/1999 | Evans, Jr. ..................... 422/120 |
| 6,347,992 B1 | 2/2002 | Durbin et al. |
| 6,363,734 B1 | 4/2002 | Aoyagi |
| 6,371,451 B1 * | 4/2002 | Choi ............................... 261/26 |

(Continued)

Primary Examiner — Helena Kosanovic
(74) Attorney, Agent, or Firm — Allen D. Hertz, P.A.; Allen D. Hertz

(57) ABSTRACT

A scent dispersion system that is integrated into an air handler of a central air conditioning system located within a facility. The scent dispersion system includes an inlet flow conduit, which is positioned within and obtains pressurized airflow from a high pressure section of the air handler. The airflow passes through a pressure application conduit into a scent reservoir. A scent generating liquid is stored within the scent reservoir. The scent generating liquid vaporizes and combines with the passing airflow creating a scent injection airflow. The scent injection airflow flows through a scent injection conduit and is discharged into a low pressure section of the air handler. The scent injection airflow combines with the conditioned air to form a scented and conditioned air mixture. The scented and conditioned air mixture is then dispersed throughout the facility using a central air conditioning ducting.

20 Claims, 7 Drawing Sheets

(56) References Cited

U.S. PATENT DOCUMENTS

| | | |
|---|---|---|
| 6,553,777 B2 | 4/2003 | Dillenback |
| 6,656,434 B1 | 12/2003 | DeMarcki |
| 6,766,651 B2 | 7/2004 | Dillenback |
| 6,887,299 B2 | 5/2005 | Weigl |
| 7,188,485 B2 * | 3/2007 | Szpekman ............. 62/304 |
| 7,223,166 B1 * | 5/2007 | Wiseman et al. ......... 454/337 |
| 8,157,508 B2 * | 4/2012 | Yano et al. ............. 415/121.3 |
| 8,255,089 B2 * | 8/2012 | Luc et al. ................ 700/283 |
| 8,483,883 B1 * | 7/2013 | Watson ................. 700/278 |
| 2006/0037330 A1 * | 2/2006 | Weigl ..................... 62/78 |
| 2006/0121844 A1 * | 6/2006 | Sparks ................. 454/337 |
| 2007/0181000 A1 | 8/2007 | Wilson et al. |
| 2007/0187530 A1 | 8/2007 | Byrd |
| 2007/0217771 A1 | 9/2007 | Granger et al. |
| 2008/0121734 A1 | 5/2008 | Cappellina |
| 2008/0207107 A1 * | 8/2008 | Matsuo et al. ........ 454/152 |
| 2010/0219258 A1 * | 9/2010 | Starcic ................... 239/1 |
| 2012/0156980 A1 * | 6/2012 | Zelicovich ............. 454/157 |

\* cited by examiner

CENTRAL AIR CONDITIONING SCENT INJECTOR

CROSS-REFERENCE TO RELATED APPLICATION

This Non-Provisional Utility application claims the benefit of U.S. Provisional Patent Application Ser. No. 61/426,614, filed on Dec. 17, 2010, which is incorporated herein in its entirety.

FIELD OF THE INVENTION

The present invention relates to a scent and disinfectant disbursement apparatus and method. More specifically, the scent and disinfectant disbursement apparatus utilizes a pressure gradient across a central air conditioning system air handler to draw and distribute scented fumes from a scent oil reservoir.

BACKGROUND OF THE INVENTION

The invention pertains to a scent and disinfectant disbursement apparatus, which utilizes a pressure gradient across a central air conditioning system air handler to draw and distribute scented fumes from a scent oil reservoir.

Central air conditioning systems disburse conditioned air throughout a structure. Air conditioning systems include a compressor and an air handler. Air conditioners utilize Boyle's law to manipulate a fluid to condition air temperature. The compressor adds energy into a system by pressurizing a fluid, which consequently elevates the temperature of the fluid. The heated fluid is then cooled to ambient temperature using fans. The ambient, compressed fluid is then allowed to expand, causing the fluid to cool. The air handler draws air in from an interior of a structure, passes the air across a heat exchanger, and returns the conditioned air to the structure through a distribution ducting system.

Disinfectant injection systems are currently available for introducing a disinfectant into an air conditioning system. These systems utilize pumps and inject vapor into the ducting portion of the air conditioning systems. In certain configurations, the system requires a parallel ducting section for the injection of the disinfectant vapor.

Accordingly, there remains a need in the art for a device that provides an apparatus and method to inject a disinfectant and/or scent into an air conditioning without complicated and expensive components.

SUMMARY OF THE INVENTION

The present invention overcomes the deficiencies of the known art and the problems that remain unsolved by providing a method and respective apparatus for distributing a scented vapor and/or a disinfectant throughout an interior of a structure, such as a residence or commercial building.

In accordance with one embodiment of the present invention, the invention consists of a vapor injection system, the system comprising:
- an air conditioning air handler integrated into a central air conditioning system, the air handler divided into a low pressure, air entry section, and a high pressure, air discharge section by a pressure divider wall;
- a scent injection assembly;
- a pressure application conduit having a first orifice end exposed to an environment within the high pressure, air discharge section and a second orifice end in fluid communication with the scent reservoir; and
- a scent injection conduit having a first orifice end in fluid communication with the scent reservoir and a second orifice end exposed to an environment within the low pressure, air entry section.

In a second aspect, a scent generating liquid is disposed within the scent injection assembly.

In another aspect, the scent injection assembly further comprises a scent reservoir and a scent injection body, wherein the scent reservoir is removably coupled to the scent injection body.

Yet another aspect, the scent injection assembly further comprises a scent control valve.

While another aspect, a scent operation control valve can be integrated within a section of the pressure application conduit.

With yet another aspect, the scent operation control valve can be integrated within a section of the scent injection conduit.

Yet another aspect, a plurality of scent dispersion reeds are disposed within the scent injection assembly, wherein the reeds are positioned extending upward from the scent generating liquid.

Regarding another aspect, an ultrasonic scent injection system comprising an ultrasonic system controller and an ultrasonic scent disbursement head, the ultrasonic system controller being in signal communication with the ultrasonic scent disbursement head and being positioned within the scent injection assembly.

In yet another aspect, the ultrasonic scent disbursement head is in fluid communication with the scent generating liquid.

In yet another aspect, the power controller for the air handler provides power to the ultrasonic scent disbursement head.

In yet another aspect, aerating the scent liquid can enhance the scent liquid vaporization. The aeration can be created by directing the pressurized airflow towards a bottom of the reservoir via an aerating conduit.

In yet another aspect, the aerator further comprises a backflow prevention device disposed at a discharge end of the aerating conduit. The backflow prevention device can be provided in a shape of an inverted U, discharging the airflow in a downward direction.

In yet another aspect, the aerator further comprises at least one check valve to further aid in controlling and minimizing any backflow.

In yet another aspect, a second exemplary embodiment of an aerator comprises a rotational shaft comprising at least one aerating blade assembly. The shaft is rotationally assembly via at least one bearing. In the exemplary embodiment, a bearing is positioned at each of an upper and a lower end of the shaft.

In yet another aspect, the second aerator embodiment is operationally driven by directing inlet airflow towards a drive blade assembly, the drive blade assembly being operationally engaged with the aerating shaft. The airflow rotates the aerating shaft, which rotates the aerating blade assembly. The aerating blade assembly aerates the scenting liquid.

And with another aspect, a method of use includes the steps of:
- obtaining a scent injection assembly, the scent injection assembly comprising a scent reservoir, an inlet orifice, and a discharge orifice;

installing a pressure application conduit between a high pressure section of a central air conditioner air handler and the scent injection assembly inlet orifice;

installing a pressure application conduit between a low pressure section of the central air conditioner air handler and the scent injection assembly discharge orifice;

applying a pressure to the scent reservoir by powering the air handler, where the air handler creates a pressure gradient between the low pressure section and the high pressure section, the sections defined by a pressure divider wall;

mixing a vaporized volume of scent generating liquid into airflow created by the air handler generated pressure; and injecting the vaporized volume of scent generating liquid into the low pressure section to be disbursed throughout an air conditioned structure using an air conditioning ducting system.

In another aspect, the scent generating liquid is vaporized using a plurality of scent dispersing reeds placed within the scent injection assembly.

In yet another aspect, the scent generating liquid is vaporized using an ultrasonic scent disbursement system.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
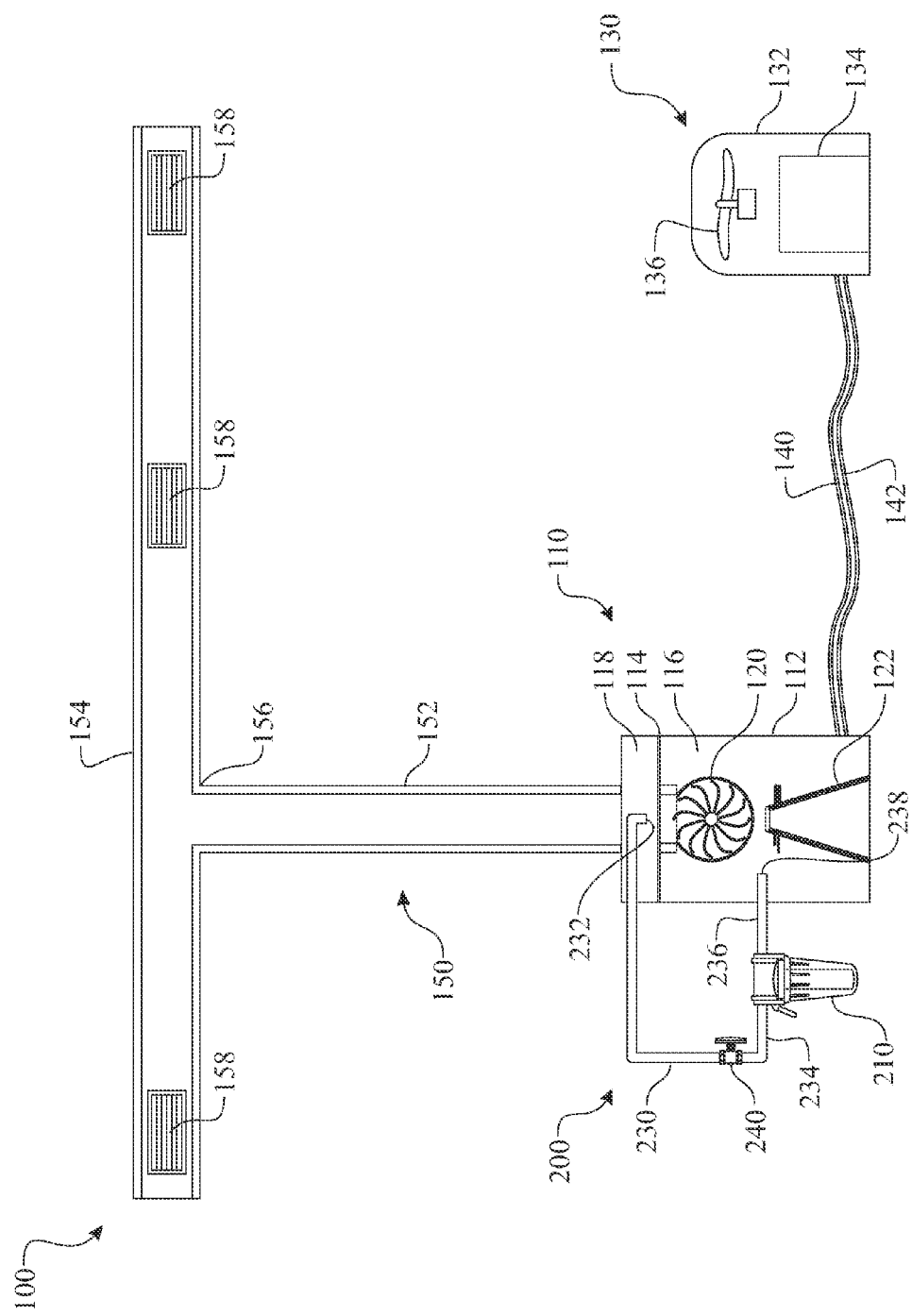
FIG. 1 presents an elevation view of an exemplary central air conditioning system having a scent injection system integrated therewith.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
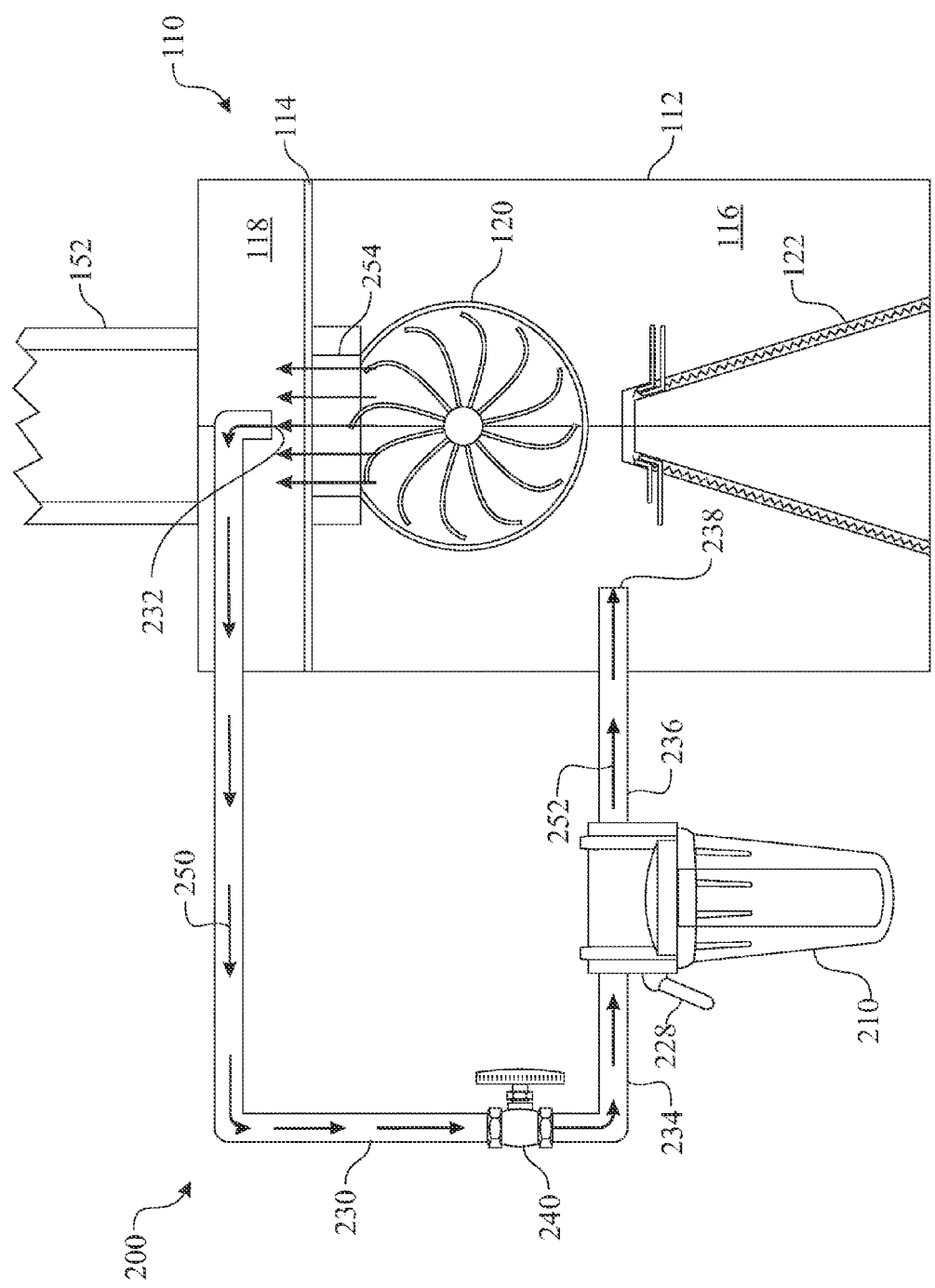
FIG. 2 presents an enlarged elevation view of an exemplary air conditioning air handler having the scent injection system integrated therewith as originally presented in FIG. 1.
Figure 3:
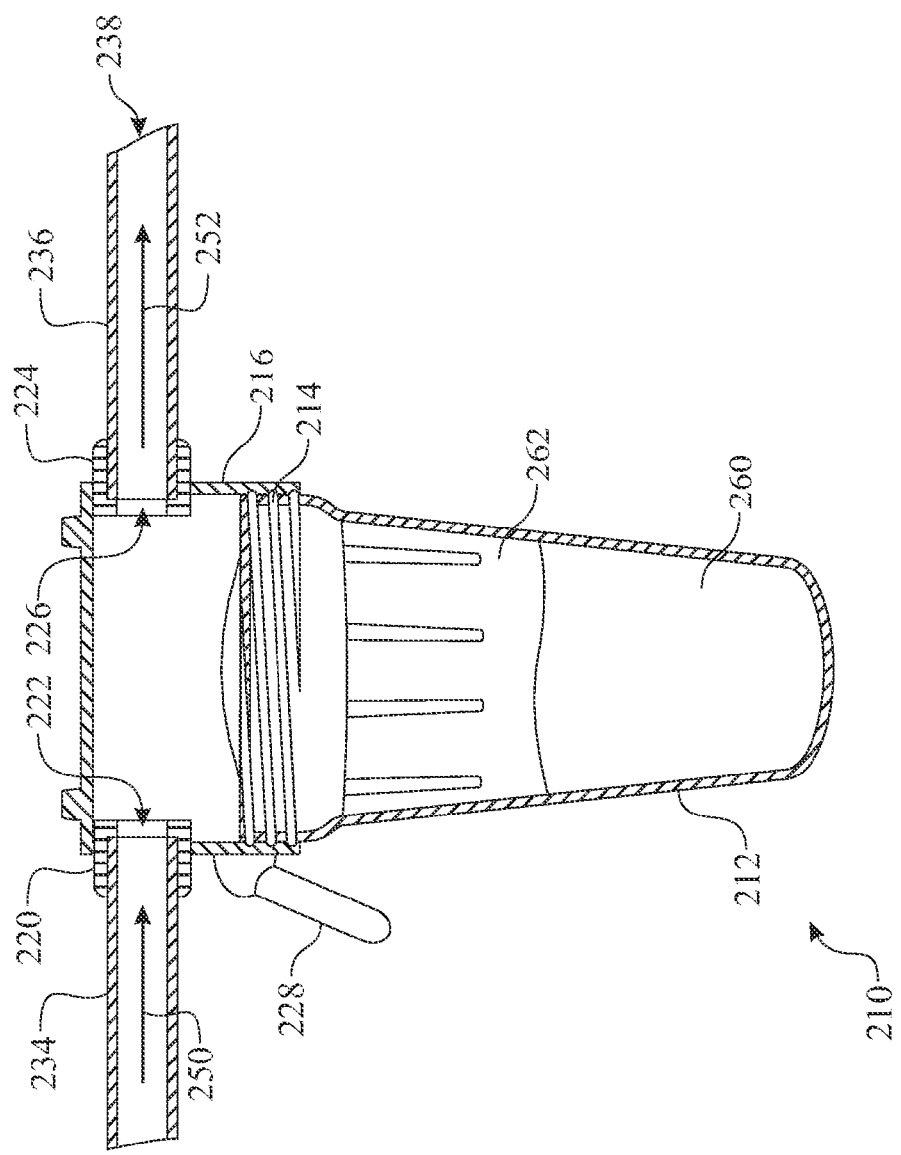
FIG. 3 presents a sectioned elevation view of the scent injection system.

A scenting central air conditioning system 100 is illustrated in FIG. 1, with details of the system being presented in the illustration in FIGS. 2 and 3. The scenting central air conditioning system 100 is disposed within a structure, such as a residence, an office building, a service provider building (such as a hospital), a storage facility, and any other facility. The scenting central air conditioning system 100 includes components common to a centralized air conditioning system, including an air handler 110, a compressor assembly 130, and an air conditioning ducting 150. The air handler 110 and compressor assembly 130 condition the air to a desired temperature. The air conditioning ducting 150 distributes the conditioned air throughout the structure.

The compressor assembly 130 includes a compressor 134 and a compressor fan 136 integrated into a compressor housing 132. The air handler 110 includes an air handler fan 120 and a heat exchanger 122 integrated within an air handler housing 112. The air handler housing 112 is segmented into a low pressure section 116 and a high pressure section 118 by a pressure divider wall 114. The air handler fan 120 creates a pressure gradient between the low pressure section 116 and the high pressure section 118 as referenced.

The air conditioning system utilises a refrigerant to provide a thermal adjustment to the ambient air. The refrigerant is supplied to the compressor assembly 130 by a refrigerant supply conduit 140, and then compressed by the compressor 134. As the refrigerant is compressed, the refrigerant increases in temperature in accordance with Boyle's law (alternately referred to as the Ideal Gas law). The compressor fan 136 cools the compressed refrigerant, preferably returning to an ambient temperature. The pressurized refrigerant is transferred to the air handler 110 by a refrigerant return conduit 142. The refrigerant expands within the heat exchanger 122. As the refrigerant expands, the refrigerant cools in accordance with Boyle's law. Ambient air passes across the heat exchanger 122. The heat exchanger 122 conditions the air temperature to the desired temperature.

The conditioned air is transferred through the facility by the air handler fan 120 and the air conditioning ducting 150. The air handler fan 120 creates the airflow and the air conditioning ducting 150 distributes the conditioned air.

A trunk ducting 152 transfers the conditioned air from the air handler 110 to a branch ducting 154. A ducting transition 156 provides fluid communication between the trunk ducting 152 and the branch ducting 154. The branch ducting 154 is routed throughout the facility to distribute the conditioned air accordingly. The conditioned air is discharged from the branch ducting 154 through a plurality of vents 158.

A scent dispersion system 200 is integrated into the air handler 110 of the central air conditioning system. The scent dispersion system 200 comprises a scent injection assembly 210, a pressure application conduit 230 and a scent injection conduit 236. The exemplary scent injection assembly 210 includes a scent reservoir 212 and an integrated scent injection body 216, wherein it is preferably that the scent reservoir 212 is removably attached to the integrated scent injection body 216 by any reasonable mechanical interface. The scent reservoir 212 can be fabricated of a translucent or transparent material allowing a service person to view and monitor the remaining volume of a scent generating liquid 260 disposed within the scent injection assembly 210. An exemplary interface utilises a releasable reservoir coupling 214 comprising a threaded interface. The integrated scent injection body 216 includes an inlet coupler 220 for attachment to the pressure application conduit 230 (or other integrated pressurized component, such as a post valve pressure application conduit 234 as illustrated) and a discharge coupler 224 for attachment to the scent injection conduit 236. An inlet orifice 222 is provided through the inlet coupler 220 for transference of the pressurized airflow from the high pressure section 118 into the scent injection assembly 210. A discharge orifice 226 is provided through the discharge coupler 224 for transference of the scented airflow from the scent injection assembly 210 into the low pressure section 116 for mixing with the conditioned air.

The pressure application conduit 230 obtains pressure from the high pressure section 118, which generates an airflow therethrough. Pressure is applied across a pressure application orifice 232 provided at a first end of the pressure application conduit 230. The pressure generates a pressure airflow 250, which enters the pressure application orifice 232, passes through the pressure application conduit 230 and into the scent injection assembly 210 through an inlet orifice 222. The scent generating liquid 260 steadily vaporizes forming a scent generating vapor 262. The scent generating vapor 262 mixes into the passing airflow forming a scent injection airflow 252, where the scent injection airflow 252 exits the scent reservoir 212, passing through the discharge orifice 226. The scent injection airflow 252 continues traveling along the scent injection conduit 236, exiting through the scent injection orifice 238 to enter into the low pressure section 116 of the air handler 110. The scented air mixture combines with the conditioned air to form a scented and conditioned air mixture 254, which is distributed throughout the facility.

An optional scent operation control valve 240 can be inserted into the system segmenting the pressure application conduit 230 into a shortened pressure application conduit 230 and a post valve pressure application conduit 234. The scent operation control valve 240 can be manually operated or automated. The automated control can be operated by a timer controlling circuit, a remote control, a user directed control, a scent management circuit, and the like. The scent management circuit can determine the quantity of scent remaining in the reservoir, the amount of scent residing within the atmosphere within the facility, and the like. Alternately, a scent dispersion flow valve control 228 can be integrated into the scent injection assembly 210 to limit the exposure of the scent generating liquid 260 to the pressure airflow 250. This can include activating and deactivating the scent dispersion system 200.

Figure 4:
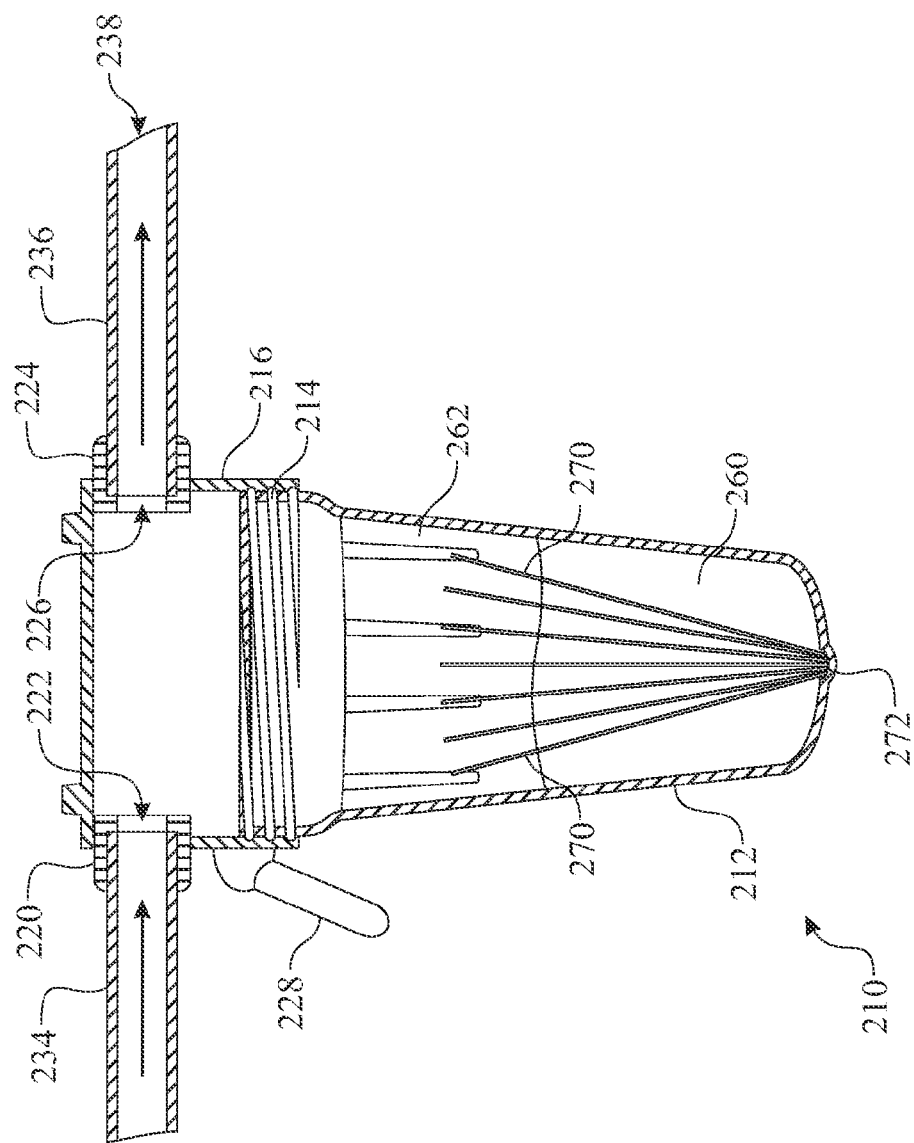
FIG. 4 presents a sectioned elevation view of the scent injection system introducing a plurality of scent reeds.

The vaporization process of the scent injection assembly 210 can be enhanced in any variety of scent enhancing apparatus. The scent enhancing apparatus accelerates a process of converting a scent generating liquid 260 into a scent generating vapor 262. A first exemplary scent enhancing apparatus utilises a plurality of scent dispersing reeds 270 as illustrated in FIG. 4. The scent dispersing reeds 270 are positioned placing one end of each scent dispersing reed 270 into the scent generating liquid 260 and leaving an opposite end of the scent dispersing reed 270 exposed within the air. An optional reed seating recession 272 can be included within a bottom of the scent reservoir 212. The lower end of the reeds 270 can be positioned in the reed seating recession 272 to direct the reeds into an outward fanning configuration as illustrated. The scent generating liquid 260 is drawn upwards through pores of the scent dispersing reed 270. The rate of evaporation is a function of the surface area between the fluid and the air. The effective surface area is increased as the scent generating liquid 260 is drawn upwards along the reeds using both surface tension and the porosity of the scent dispersing reed 270, thus increasing the effective surface area between the fluid and the surrounding air within the scent injection assembly 210. One of the benefits of the scent dispersing reeds 270 is the lack of any power requirement. The reeds 270 should be replaced on a regular basis, causing some basic maintenance.

Figure 5:
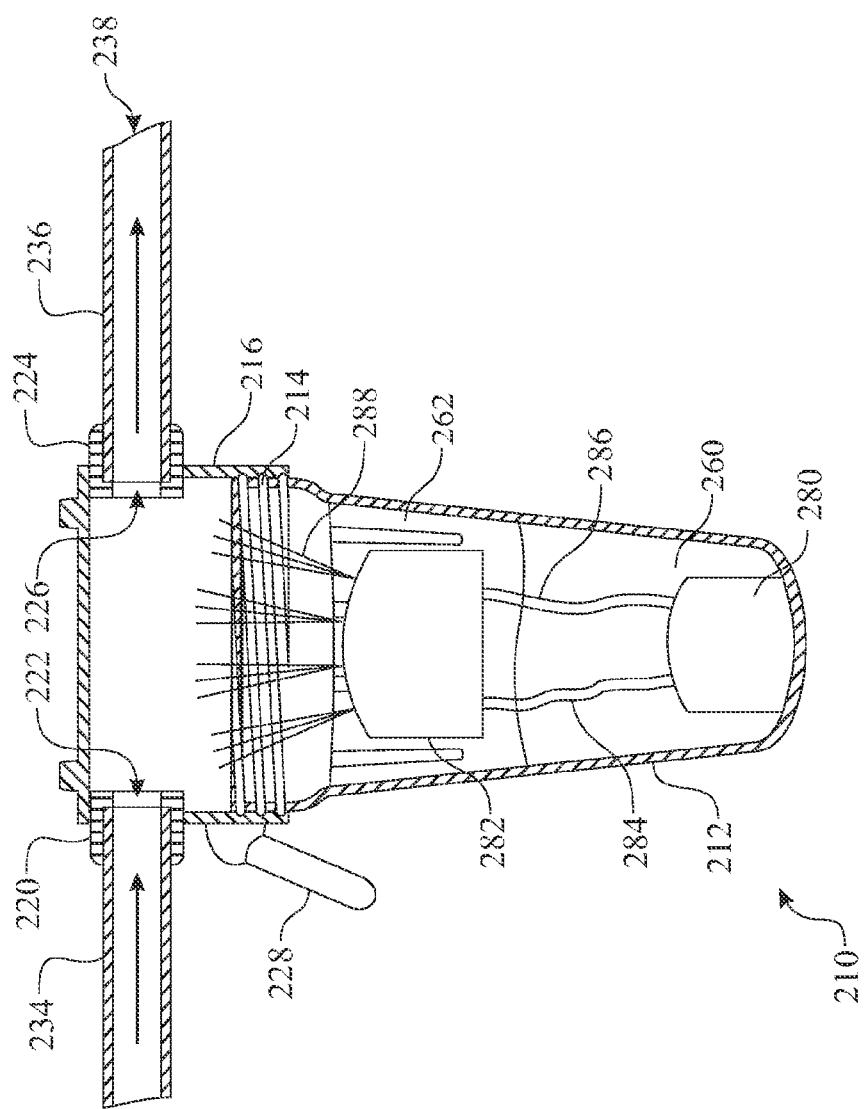
FIG. 5 presents a sectioned elevation view of the scent injection system introducing an ultrasonic scent vaporizing system.

A second exemplary scent enhancing apparatus utilizes an ultrasonic system to vaporize the scent generating liquid 260 as illustrated in FIG. 5. The ultrasonic vaporization system can be of any configuration known by those skilled in the art. The exemplary ultrasonic vaporization system includes an ultrasonic system controller 280 in electric and fluid communication with an ultrasonic scent disbursement head 282. An electrical interface 284 provides electrical communication between the ultrasonic system controller 280 and the ultrasonic scent disbursement head 282. A fluid conduit 286 provides fluid communication between the ultrasonic system controller 280 and the ultrasonic scent disbursement head 282. Power can be provided by a continuous external power source, such as an electrical outlet and a power cord (not shown but well understood) or by utilizing an integrated battery (not shown but well understood). The power can be governed by the same power source controlling the operation of the air handler 110. A timer can be included in the power circuit to control the operating vaporization time of the ultrasonic vaporization system. The ultrasonic system controller 280 transfers scent generating liquid 260 from the base of the scent reservoir 212 to the ultrasonic scent disbursement head 282. A controller circuit (not shown, but well known by those skilled in the art) operates the ultrasonic scent disbursement head 282 converting the liquid into a vapor. More specifically, the ultrasonic scent disbursement head 282 converts the scent generating liquid 260 into a vaporized scent 288. The system can be integrated into a single assembly. The system would preferably include a floatation element to maintain a vaporization surface proximate a liquid surface.

Figure 6:
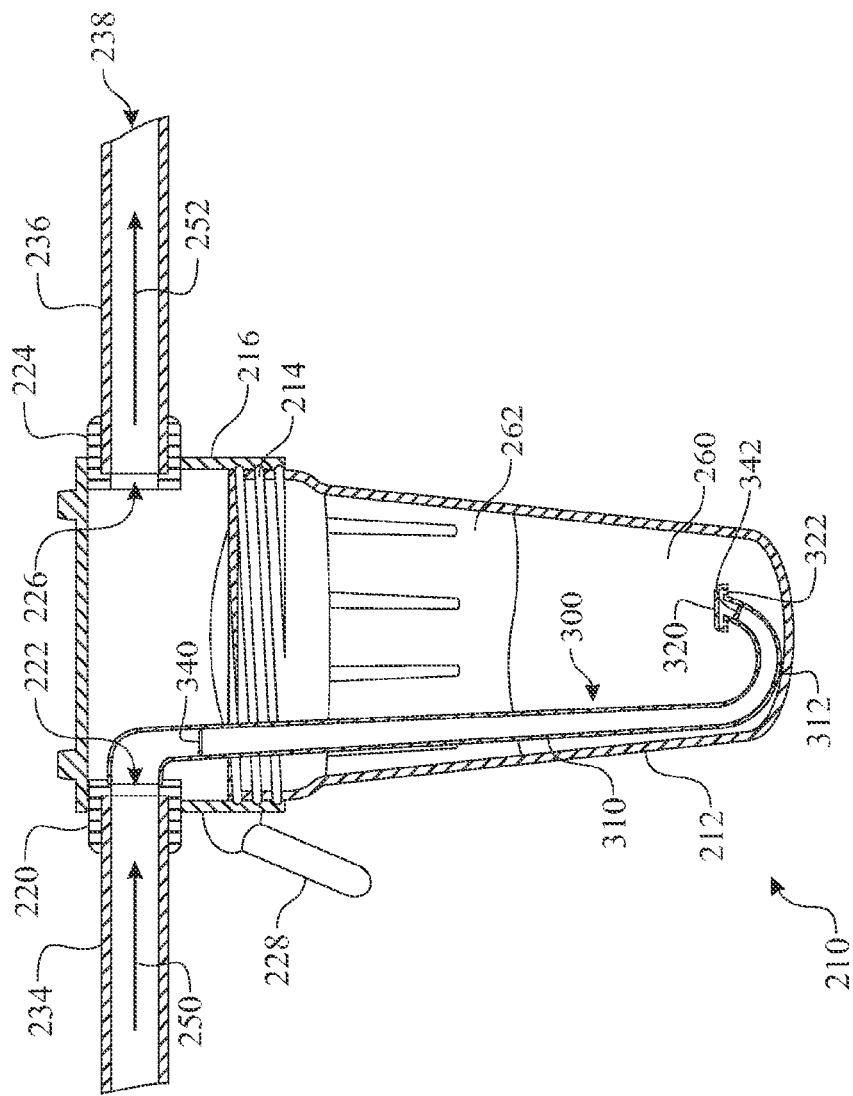
FIG. 6 presents a sectioned elevation view of the scent injection system introducing a first exemplary aerator vaporization assistance system.

A third exemplary scent enhancing apparatus aerates the scent generating liquid 260. The aeration process can be provided by any known by those skilled in the art. A first exemplary aeration system 300 directs the pressure airflow 250 into the scent generating liquid 260 as illustrated in FIG. 6. The pressure airflow 250 is communicated downward via an aerator 300 and discharges into a lower region of the stored volume of scent generating liquid 260. The aerator 300 is fabricated having an aerating conduit 310. The aerating conduit 310 can be of any form factor that discharges the pressure airflow 250 into the scent generating liquid 260. In one form factor, the aerating conduit 310 can be flexible, with the discharge orifice of the aerating conduit 310 being attached to a floatation device, maintaining the discharge orifice at a constant level respective to the scent generating liquid surface. In a second form factor, the aerating conduit 310 can be directed downward, curving upwards at an aerating conduit lower apex 312. A backflow prevention device 320 can be disposed at the discharge orifice. The backflow prevention device 320 redirects the aerator discharge port 322 downward, allowing air pressure to prevent intrusion of the scent generating liquid 260 into the aerating conduit 310. At least one check valve, such as an upper check valve 340 or a lower check valve 342 can be integrated into the aerator 300 to further aid in controlling and minimizing any backflow. The pressure airflow 250 discharges from the aerator discharge port 322 into the scent generating liquid 260. The gaseous discharge aerates the scent generating liquid 260. The aeration increases the rate of vaporization of the scent generating liquid 260. The backflow prevention features minimize a need to displace any scent liquid that could have collected within the aerating conduit 310.

Figure 7:
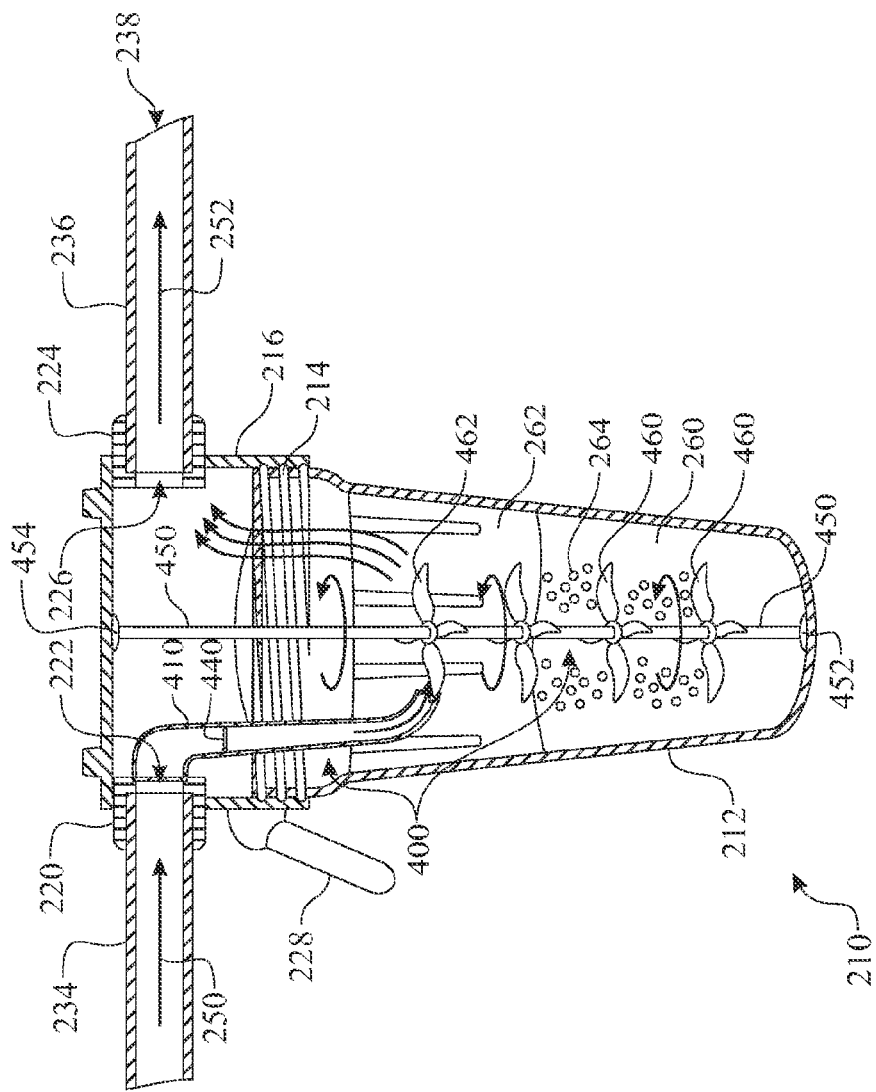
FIG. 7 presents a sectioned elevation view of the scent injection system introducing a second exemplary aerator vaporization assistance system.

A second exemplary aerator 4001 utilizes a rotational assembly comprising at least one aerating blade assembly 460 for aerating the scent generating liquid 260 as illustrated in FIG. 7. The aerator 4001 comprises an aerating conduit 410 for directing airflow 250 to rotationally drive an aerating assembly. An upper check valve 440 can be integrated into the aerating conduit 410 to control any potential backflow of the scent generating liquid 260 into the aerating conduit 410. The aerating assembly comprises an aerator shaft 450 rotationally assembled to the scent injection assembly 210 in any reasonably known rotational interface. The exemplary embodiment integrates a lower shaft bearing 452 at a lower end of the aerator shaft 450 and an upper shaft bearing 454 at an upper end of the aerator shaft 450. The lower shaft bearing 452 is positioned against a lower apex of the scent reservoir 212. The upper shaft bearing 454 is located against an interior surface of an upper member of the integrated scent injection body 216, vertically orienting the aerator shaft 450. At least one aerating blade assembly 460 is assembled to the aerator shaft 450. The aerating blade assembly 460 should be balanced about the aerator shaft 450 to avoid any unwarranted vibrations. It is preferred that a plurality of aerating blade assemblies 460 be assembled to the aerator shaft 450 in a spatial arrangement. The lowest aerating blade assembly 460 should be located proximate the bottom of the scent reservoir 212, optimizing the aeration of the scent generating liquid 260. A drive blade assembly 462 is assembled to the aerator shaft 450 at a position to receive pressure airflow 250 from the aerating conduit 410. The pressure airflow 250 passes across the drive blade assembly 462 causing the drive blade assembly 462 to rotate. The rotational motion of the drive blade assembly 462 is transferred to the aerator shaft 450, which rotates the at least one aerating blade assembly 460. The rotational motion of the aerating blade assembly 460 aerates the scent generating liquid 260 creating generated scented air bubbles 264. The generated scented air bubbles 264 rise to the surface and combine with passing airflow, forming the scent injection airflow 252.

Although the primary disclosure presents a scent dispersion system, it is understood that a disinfectant may be utilized ether in place of or in conjunction with the scent generating liquid 260.

The scent dispersion system 200 can be integrated into any air conditioning system, including automotive applications, trains, planes, and the like. The pressure application orifice 232 would be placed in an upstream region of a heat exchanger/air movement fan or blower and the scent injection orifice 238 would be placed in a position downward from the fan, drawing the scented air inward.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An air conditioning vapor injection system comprising:
   an air conditioning air handler integrated into a central air conditioning system, said air handler having an air handler housing divided into a low pressure air entry section, and a high pressure air discharge section by a pressure divider wall, a pressure differential being created by an air handler fan located within the air handler housing with the low pressure air entry section being located on a supply side of the air handler fan and the high pressure air discharge section being located on a discharge side of the air handler fan;
   a scent injection assembly comprising a scent reservoir;
   a pressure application conduit having a first orifice end connected to said high pressure air discharge section of the air handler housing and a second orifice end connected to and in fluid communication with said scent injection assembly; and
   a scent injection conduit having a first orifice end connected to and in fluid communication with said scent injection assembly and a second orifice end connected to said low pressure air entry section of the air handler housing.

2. An air conditioning vapor injection system as recited in claim 1, said system further comprising a scent generating liquid disposed within said scent reservoir.

3. An air conditioning vapor injection system as recited in claim 1, said pressure application conduit first orifice end being located proximate an upper region of said scent injection assembly and said scent injection conduit first orifice end also being located proximate an upper region of said scent injection assembly.

4. An air conditioning vapor injection system as recited in claim 3, said scent injection assembly further comprising an integrated scent injection body, wherein said pressure application conduit first orifice end and said scent injection conduit first orifice end are mechanically coupled with said integrated scent injection body in a manner providing fluid communication therethrough.

5. An air conditioning vapor injection system as recited in claim 4, said scent reservoir and said integrated scent injection body further comprising a releasable reservoir coupling interface provided therebetween, enabling removal and reassembly of said scent reservoir from and to said scent injection body, respectively.

6. An air conditioning vapor injection system as recited in claim 1, said scent injection assembly further comprising a scent dispersion flow valve enabling flow control of a scent emitted from a scent oil disposed within said scent reservoir into said scent injection conduit.

7. An air conditioning vapor injection system as recited in claim 1, said air conditioning vapor injection system further comprising at least one scent enhancing apparatus, wherein said at least one scent enhancing apparatus accelerates a process of converting a scent generating liquid into a scent generating vapor.

8. An air conditioning vapor injection system comprising:
an air conditioning air handler integrated into a central air conditioning system, said air handler having an air handler housing divided into a low pressure air entry section, and a high pressure air discharge section by a pressure divider wall, a pressure differential being created by an air handler fan located within the air handler housing with the low pressure air entry section being located on a supply side of the air handler fan and the high pressure air discharge section being located on a discharge side of the air handler fan;
a scent injection assembly comprising a scent reservoir;
a pressure application conduit having a first orifice end connected to within said high pressure, air discharge section of the air handler housing and a second orifice end connected to and in fluid communication with said scent injection assembly;
an aerator connected to said pressure application conduit second orifice end and to a lower region of said scent reservoir; and
a scent injection conduit having a first orifice end connected to and in fluid communication with said scent injection assembly and a second orifice end connected to said low pressure, air entry section of the air handler housing.

9. An air conditioning vapor injection system as recited in claim 8, said system further comprising a scent generating liquid disposed within said scent reservoir.

10. An air conditioning vapor injection system as recited in claim 8, said pressure application conduit first orifice end being located proximate an upper region of said scent injection assembly and said scent injection conduit first orifice end also being located proximate an upper region of said scent injection assembly.

11. An air conditioning vapor injection system as recited in claim 8,
said scent injection assembly further comprising an integrated scent injection body, wherein said pressure application conduit first orifice end and said scent injection conduit first orifice end are mechanically coupled with said integrated scent injection body in a manner providing fluid communication therethrough.

12. An air conditioning vapor injection system as recited in claim 11,
said scent reservoir and said integrated scent injection body further comprising a releasable reservoir coupling interface provided therebetween, enabling removal and reassembly of said scent reservoir from and to said scent injection body, respectively.

13. An air conditioning vapor injection system as recited in claim 8, said scent injection assembly further comprising a scent dispersion flow valve enabling flow control of a scent emitted from a scent oil disposed within said scent reservoir into said scent injection conduit.

14. An air conditioning vapor injection system as recited in claim 8, said aerator further comprising a backflow prevention device to prevent fluid from flowing into said pressure application conduit.

15. An air conditioning vapor injection system comprising:
an air conditioning air handler integrated into a central air conditioning system, said air handler having a air handler housing divided into a low pressure air entry section, and a high pressure air discharge section by a pressure divider wall, a pressure differential being created by an air handler fan located within the air handler housing with the low pressure air entry section being located on a supply side of the air handler fan and the high pressure air discharge section being located on a discharge side of the air handler fan;
a scent injection assembly comprising a scent reservoir;
a pressure application conduit having a first orifice end connected to said high pressure, air discharge section of the air handler housing and a second orifice end connected to and in fluid communication with said scent injection assembly;
a scent operation control valve integrated into said pressure application conduit at a location between said pressure application conduit first orifice and said pressure application conduit second orifice, wherein said scent operation control valve controls a volume flow of pressure into said scent injection assembly; and
a scent injection conduit having a first orifice end connected to and in fluid communication with said scent injection assembly and a second orifice end connected to said low pressure, air entry section of the air handler housing.

16. An air conditioning vapor injection system as recited in claim 15, said system further comprising a scent generating liquid disposed within said scent reservoir.

17. An air conditioning vapor injection system as recited in claim 15, said pressure application conduit first orifice end being located proximate an upper region of said scent injection assembly and said scent injection conduit first orifice end also being located proximate an upper region of said scent injection assembly.

18. An air conditioning vapor injection system as recited in claim 17, said scent injection assembly further comprising an integrated scent injection body, wherein said pressure application conduit first orifice end and said scent injection conduit first orifice end are mechanically coupled with said integrated scent injection body in a manner providing fluid communication therethrough.

19. An air conditioning vapor injection system as recited in claim 18, said scent reservoir and said integrated scent injection body further comprising a releasable reservoir coupling interface provided therebetween, enabling removal and reassembly of said scent reservoir from and to said scent injection body, respectively.

20. An air conditioning vapor injection system as recited in claim 15, said air conditioning vapor injection system further comprising at least one scent enhancing apparatus, wherein said at least one scent enhancing apparatus accelerates a process of converting a scent generating liquid into a scent generating vapor.

* * * * *